US011556519B2

(12) United States Patent
Laskawiec et al.

(10) Patent No.: US 11,556,519 B2
(45) Date of Patent: Jan. 17, 2023

(54) ENSURING INTEGRITY OF RECORDS IN A NOT ONLY STRUCTURED QUERY LANGUAGE DATABASE

(71) Applicant: INTERNATIONAL BUSINESS MACHINES CORPORATION, Armonk, NY (US)

(72) Inventors: Andrzej Laskawiec, Cracow (PL); Michal Bodziony, Tegoborze (PL); Lukasz S. Studzienny, Cracow (PL); Marcin Filip, Cracow (PL); Marcin Luczynski, Cracow (PL); Monika Piatek, Cracow (PL); Tomasz Zatorski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 16/145,010

(22) Filed: Sep. 27, 2018

(65) Prior Publication Data

US 2020/0104391 A1    Apr. 2, 2020

(51) Int. Cl.
*G06F 16/22*    (2019.01)
*G06F 16/23*    (2019.01)

(52) U.S. Cl.
CPC ...... *G06F 16/2365* (2019.01); *G06F 16/2237* (2019.01); *G06F 16/2255* (2019.01)

(58) Field of Classification Search
CPC ............. G06F 16/2365; G06F 16/2237; G06F 16/2255
USPC ........................................................ 707/690
See application file for complete search history.

(56) References Cited

U.S. PATENT DOCUMENTS

| 6,560,598 | B2 | 5/2003 | Delo et al. |
| 8,214,354 | B2 | 7/2012 | Chong et al. |
| 8,838,531 | B2 | 9/2014 | Bentkofsky et al. |
| 9,218,409 | B2 | 12/2015 | Weinberg et al. |
| 2012/0095974 | A1* | 4/2012 | Bentkofsky ......... G06F 16/2365 707/703 |
| 2018/0137199 | A1* | 5/2018 | Miller ................... G06F 16/951 |

OTHER PUBLICATIONS

Hacigümüş et al., "Encrypted Database Integrity in Database Service Provider Model," Certification and Security in E-Services (IFIP WCC TC11 2002), Aug. 26-29, 2002, p. 165-174, vol. 127, Springer.
Paladi et al., "Model Based Testing of Data Constraints: Testing the Business Logic of a Mnesia Application with Quviq Quickcheck," Proceedings of the 8th ACM SIGPLAN workshop on ERLANG (ERLANG '09), Sep. 5, 2009, p. 71-81, ACM, Edinburgh, Scotland, UK.

* cited by examiner

*Primary Examiner* — Hosain T Alam
*Assistant Examiner* — Tracy M McGhee
(74) *Attorney, Agent, or Firm* — Rakesh Roy

(57) ABSTRACT

A method, computer system, and a computer program product for ensuring integrity of records in a NoSQL database including a first table and a second table is provided. The present invention may include the first table having first records representing respective first entities and the second table having second records representing respective second entities. The present invention may include using a hash table associating each second entity of the second table with the respective hash or summary hash values of first records for reading the second records of the second table.

20 Claims, 5 Drawing Sheets

| rowid | Index | Name | # | TS |
|---|---|---|---|---|
| A1 | 0 | Name1 | #A1 | TS1 |
| A2 | 1 | Name2 | #A2 | TS2 |
| A3 | 2 | Name3 | #A3 | TS3 |

FIG. 3A

| Rowid | Index | Title | Authors (set/list) | Authors data map (hidden) |
|---|---|---|---|---|
| B1 | 0 | Title1 | Author =>A1, coauthor =>A2, foreword =>A3 | Rowid=>A1, Name=>Name1, #=>#A1<br>Rowid=>A2, Name=>Name2, #=>#A2<br>Rowid=>A3, Name=>Name3, #=>#A3<br>Row# = $\sum_{n=3}^{-1}$ (#An) or Row# = XOR (#An)<br>Row# = #A1 xor #A2 xor #A3 = #A123 |
| B2 | 1 | Title2 | Author =>A1 | Rowid=>A1, Name=>Name1, #=>#A1<br>Row# = #A1 |
| B3 | 2 | Title3 | Author =>A3 | Rowid=>A3, Name=>Name3, #=>#A3<br>Row# = #A3 |
| B4 | 3 | Title4 | Author =>A2 | Rowid=>A2, Name=>Name2, #=>#A2<br>Row# = #A2 |

FIG. 3B

|   | B1, index 0 | B2, index 1 | B3, index 2 | B4, index 3 |
|---|---|---|---|---|
| # | #A123 | #A1 | #A3 | #A2 |

FIG. 3C

|              | B1, index 0 | B2, index 1 | B3, index 2 | B4, index 3 |
|--------------|-------------|-------------|-------------|-------------|
| A1, index 0  | 1           | 1           |             |             |
| A2, index 1  | 1           |             |             | 1           |
| A3, index 2  | 1           |             | 1           |             |

451

| rowid | Index | Name   | #    | TS  |
|-------|-------|--------|------|-----|
| A1    | 0     | Name11 | #A11 | TS1 |
| A2    | 1     | Name2  | #A2  | TS2 |
| A3    | 2     | Name3  | #A3  | TS3 |

480

|   | B1, index 0              | B2, index 1            | B3, index 2 | B4, index 3 |
|---|--------------------------|------------------------|-------------|-------------|
| # | #A123-#A1+#A11<br>=#A1123 | #A1-#A1+#A11<br>=#A11 | #A3         | #A2         |

ENSURING INTEGRITY OF RECORDS IN A NOT ONLY STRUCTURED QUERY LANGUAGE DATABASE

BACKGROUND

The present invention relates generally to the field of computing, and more particularly to databases.

A not only structured query language ("NoSQL") database provides a mechanism for storage and retrieval of data that is modeled in means other than the tabular relations used in relational databases. NoSQL databases store many to many relationships by storing them redundantly (e.g., in NoSQL databases there are no referential integrity). It is the responsibility of database designer to ensure that the denormalized database does not become inconsistent. However, this increases the risk that the data of the NoSQL database may get out of sync with one another.

SUMMARY

Embodiments of the present invention disclose a method, computer system, and a computer program product for ensuring integrity of records in a NoSQL database. The present invention may include ensuring integrity of records in a NoSQL database having a first table and a second table, the first table having first records representing respective first entities and the second table having second records representing respective second entities. The present invention may include for each first entity of the first table calculating a hash value using all attributes of the first record representing the first entity and storing the hash value in the first record. The present invention may include in case a second record of the second table contains a single reference to a first entity of the first table, copying data of the first record of the referenced first entity to the second record. The present invention may include in case the second record contains several references to first entities of the first table, copying data of the first records of the referenced first entities to the second record and calculating a summary hash value based on all hash values of said referenced first entities. The present invention may include storing in the second record the hash value of the referenced first entity or the summary hash value of the referenced more than one first entity. The present invention may include creating a hash table associating each second entity of the second table with the respective hash or summary hash values. The present invention may include when reading a given second record of the second table, comparing the hash or summary hash value of the given second record with the value associated with the second entity of the given second record in the hash table, and if said comparison step results in a match, returning data of the one or more first records of the given second record from the second table and if said comparison step results in no match, reading the one or more first records of the given second record from the first table, and updating the first records in the second record.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3A is an exemplary table depicting the result of a modification to a first table according to at least one embodiment;

FIG. 3B is an exemplary table depicting the result of a modification to a second table according to at least one embodiment;

FIG. 3C is an exemplary hash table according to at least one embodiment;

DETAILED DESCRIPTION

Figure 1:
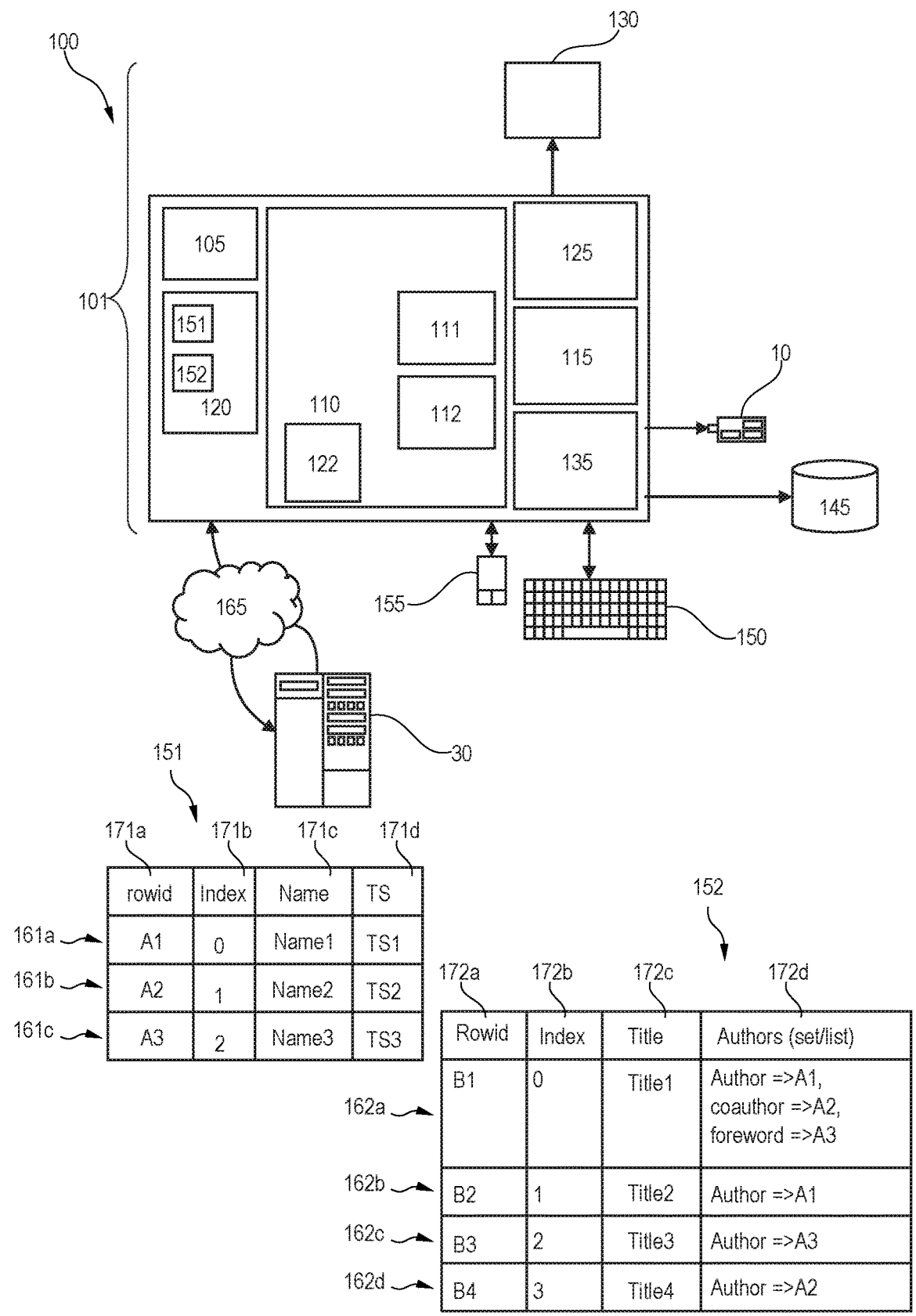
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for preventing integrity violations in NoSQL databases. As such, the present embodiment has the capacity to improve the technical field of databases by automatically copying data at writing and synchronizing data at reading. Reducing the risk of data denormalization may improve the performance of the NoSQL database (e.g., in that accurate data query responses may be provided).

According to one embodiment, the present disclosure may include creating a bitmap index associating each second entity to first entities to which the second entity refers. The present disclosure may then include upon a modification of a first record of the first table: recalculating the hash value of the modified first record. The present disclosure may also include using the bitmap index to identify the second entities associated with the first entity of the modified first record. The present disclosure may further include modifying the hash values of the identified second entities in accordance with the recalculated hash value. The bitmap index may enable updating the NoSQL database in a systematic and consistent way. The bitmap index may enable a centralized approach for updating multiple tables.

According to one embodiment, the reading of the first records from the first table and updating of the first records in the given second record may be performed record by record, and for each first record copied to the given second record, the summary hash value may be recalculated using all hash values of existing first records of the given second record and may be compared with the hash value in the hash table and if it is the same, the copying of the records may be stopped. This may prevent copying the same data that exists in the second table. This may save processing resources that would otherwise be required for copying every record including the ones that already exist in the second table.

According to one embodiment, the method may include providing a database shard; splitting the first records into multiple sets of first records; storing each set of first records in a shard of the database shard, wherein the shard further may include an indication of each first entity of the set of first records and the one or more second entities that refer to the first entity; splitting the second records into multiple sets of second records; storing each set of second records in a shard of the database shard hash values, wherein the shard may further include for each second record of the set of second records, the hash value or the summary hash value. Using the shard architecture may enable an improved and systematic management of data of the first and second tables in accordance with the present embodiment.

According to one embodiment, in response to a change in a first record of a given shard, an update request may be automatically sent by the shard to the shards including the second records that refer to the first record, wherein the update request may include the hash value of the first record before being modified and the hash value determined for the modified first record. For example, for the case of the first entities being authors and second entities being books that may reference or are linked to authors. In case an author is deleted from the first table, this embodiment may implement cascade constraints by for example removing the deleted author from all linked books.

According to one embodiment, the recalculating of the summary hash value of the modified first record may include subtracting the hash value that has been modified and adding the modified hash value to the summary hash value. The hash table may be updated accordingly. This may enable a systematic approach for consistently calculating and updating the hash values. This may increase the accuracy of the query responses. This may contrast an example where the hashes are updated independently of how the hash values were initially calculated which may lead to returning data that is not the requested data. For example, if the summary hash value of a second record X (referencing two first entities A and B) has changed using a technique that does not take into account the initial way of calculating the summary hash value, and another second record Y is newly added to the second table and this second record Y references the same two first entities A and B, the summary hash value of the second record Y may be different from the summary hash value of the second record X.

Referring to FIG. 1, an exemplary computer system 100 in accordance with one embodiment is depicted.

It will be appreciated that the methods described herein may be at least partly non-interactive, and may be automated by way of computerized systems, such as servers or embedded systems. In exemplary embodiments, the methods described herein may be implemented in a (partly) interactive system. The methods described herein may further be implemented in software 112, 122 (including firmware 122), hardware (processor) 105, or a combination thereof. In exemplary embodiments, the methods described herein may be implemented in software, as an executable program, and may be executed by a special or general-purpose digital computer, such as a personal computer, workstation, minicomputer, or mainframe computer. In one embodiment, the computer system 100 may include a general-purpose computer 101.

In exemplary embodiments, as shown in FIG. 1, the computer 101 may include a processor 105, memory (main memory) 110 coupled to a memory controller 115, and one or more input and/or output (I/O) devices (or peripherals) 10, 145 that may be communicatively coupled via a local input/output controller 135. The input/output controller 135 may include, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein, the I/O devices 10, 145 may generally include any generalized cryptographic card or smart card known in the art.

The processor 105 may include a hardware device for executing software, particularly software that may be stored in memory 110. The processor 105 may be any custom made or commercially available processor, a central processing unit (CPU), an auxiliary processor among several processors associated with the computer 101, a semiconductor-based microprocessor (in the form of a microchip or chip set), a macroprocessor, or generally any device for executing software instructions.

The memory 110 may include any one or combination of volatile memory elements (e.g., random access memory (RAM, such as DRAM, SRAM, SDRAM, etc.)) and non-volatile memory elements (e.g., ROM, erasable programmable read only memory (EPROM)), electronically erasable programmable read only memory (EEPROM), programmable read only memory (PROM). Note that the memory 110 may include a distributed architecture, where various components may be situated remote from one another, but may be accessed by the processor 105.

The software in memory 110 may include one or more separate programs, each of which may include an ordered listing of executable instructions for implementing logical functions, notably, functions involved in embodiments of this invention. In the example of FIG. 1, software in the memory 110 may include instructions 112 (e.g., instructions to manage databases such as a database management system).

The software in memory 110 may typically include a suitable operating system (OS) 111. The OS 111 may essentially control the execution of other computer programs, such as, software 112 for implementing methods as described herein.

The methods described herein may be in the form of a source program 112, executable program 112 (object code), script, or any other entity comprising a set of instructions 112 to be performed. When a source program, the program may need to be translated via a compiler, assembler, interpreter, or the like, which may or may not be included within the memory 110, so as to operate properly in connection with the OS 111. Furthermore, the methods may be written as an object-oriented programming language, which may have classes of data and methods, or a procedure programming language, which may have routines, subroutines, and/or functions.

In exemplary embodiments, a conventional keyboard 150 and mouse 155 may be coupled to the input/output controller 135. Other output devices such as the I/O devices 145 may include input devices, for example, but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 may include any generalized cryptographic card or smart card known in the art. The system 100 may further include a display controller 125 coupled to a display 130. In exemplary embodiments, the system 100 may further include a network interface for coupling to a network 165. The network 165 may include an IP-based network for communication between the computer 101 and any external server, client and the like via a broadband connection. The network 165 may transmit and receive data between the computer 101 and external systems 30, which may be involved to perform part, or all of the steps of the methods discussed herein. In exemplary embodiments, network 165 may be a managed IP network administered by a service provider. The network 165 may be implemented in a wireless fashion, e.g., using wireless protocols and technologies, such as Wi-Fi, WiMAX, etc. The network 165 may include a packet-switched network such as a local area network, wide area network, metropolitan area network, Internet network, or other similar type of network environment. The network 165 may be a fixed wireless network, a wireless local area network (LAN), a wireless wide area network (WAN), a personal area network (PAN), a virtual private network (VPN), intranet or other suitable network system and may include equipment for receiving and transmitting signals.

The computer 101 may include a PC, a workstation, an intelligent device, or the like. The software in the memory 110 may include a basic input output system (BIOS) 122. The BIOS 122 may include a set of essential software routines that may initialize and test hardware at startup, start the OS 111, and may support the transfer of data among the hardware devices. The BIOS may be stored in ROM so that the BIOS may be executed when the computer 101 is activated.

When the computer 101 is in operation, the processor 105 may be configured to execute software 112 stored within the memory 110, to communicate data to and from the memory 110, and to generally control operations of the computer 101 pursuant to the software 112. The methods described herein and the OS 111, in whole or in part, but typically the latter, may be read by the processor 105, may be buffered within the processor 105, and then may be executed.

When the systems and methods described herein are implemented in software 112, as is shown in FIG. 1, the methods may be stored on any computer readable medium, such as storage 120, for use by or in connection with any computer related system or method. The storage 120 may comprise a disk storage such as HDD storage.

The storage 120 may store NoSQL databases comprising one or more first tables 151 and one or more second tables 152. For the purpose of clarity, only one example of a first table 151 and a second table 152 is described in FIG. 1.

In one embodiment, the first table 151 may include, for example, an AUTHORS table. Each first record 161*a-c* of the first table 151 may represent a respective first entity (e.g., an author). The first records 161*a-c* may include values of attributes 171*a-d* that may be indicative (or may be properties) of the first entities that may be represented by the first records. For example, the author that is represented by the first record 161*a* has a name attribute 171*c* value of "Name1" and a time stamp (TS) attribute 171*d* indicating the time at which the record was last modified or created.

The first record 161*a* may further include attributes 171*a* which may include a row id and 171*b* which may include an index for identifying the first record and for facilitating the search of the first record 161*a*.

In one embodiment, the second table 152 may include, for example, a BOOKS table storing books records. Each second record 162*a-d* of the second table 152 may represent a second entity (e.g., a book). The second records 162*a-d* may include values of attributes 172*a-d* that may be indicative (or may be properties) of the second entities that may be represented by the second records. Each book may contain a collection of authors named Authors which may include values of the attribute 'Authors' 172*d*. In one embodiment, a second record 162*a-d* may refer or reference one or more authors which may include values of the attribute 172*d* of that second record. For example, the second record 162*a* represents a book having authors A1, A2 and A3 that are represented by records 161*a-c* in the first table 151. The second record 162*a* may further include attribute 172*a* which may include a row id and 172*b* which may include an index for identifying the second record and for facilitating the search of the second record 162*a*. The second record 162*a* may further include a value of the title attribute 172*c* indicating the title of the book represented by the second record 162*a*.

However, in another embodiment, the first table 151 and the second table 152 may include no referential integrity as they belong to a NoSQL database.

Figure 2:
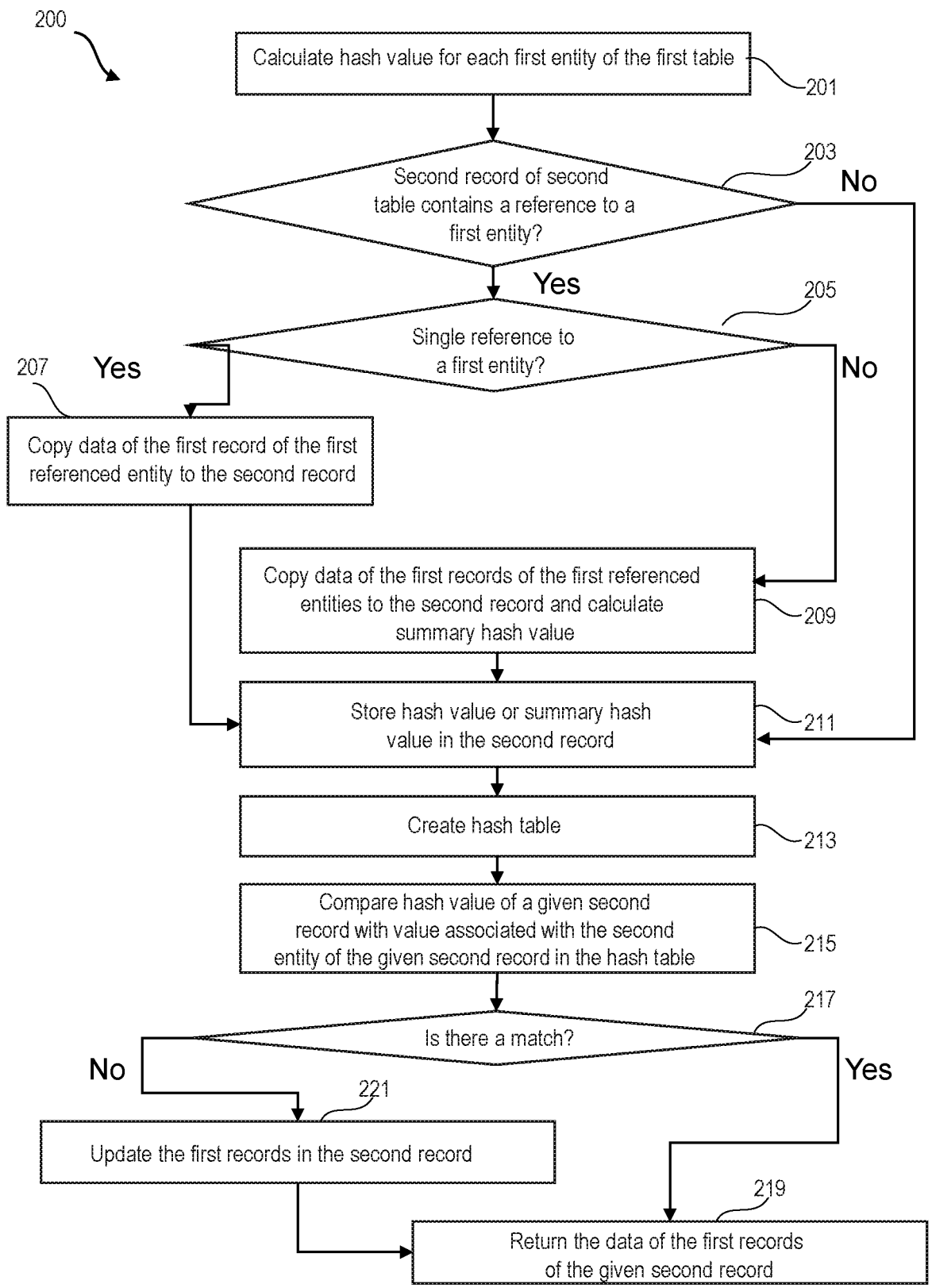
FIG. 2 is an operational flowchart illustrating a process for ensuring integrity of records in a NoSQL database according to at least one embodiment.

Referring now to FIG. 2, an operational flowchart illustrating the exemplary process 200 for ensuring integrity of records in a NoSQL database including a first table and a second table according to at least one embodiment is depicted. In addition, FIG. 1 (e.g., first table 151, second table 152) and FIGS. 3A-3C may be referenced in describing the process 200.

FIG. 3A depicts an example first table 351 which is the result of a modification of the first table 151 in accordance with at least one embodiment. The first table 351 may include first records 361*a-c* and each of the first records 361*a-c* may include values of attributes 371*a-e*. Each of the first records 361*a-c* may represent a respective first entity (e.g., an author). For example, the first record 361*a* may represent the author A1.

FIG. 3B depicts an example second table 352 which is the result of a modification of the second table 152 in accordance with at least one embodiment. The second table 352 may include second records 362*a-c* and each of the second records 362*a-c* may include values of attributes 372*a-e*. Each of the second records 362*a-c* may represent a respective entity (e.g., a book). For example, the second record 362*a* may represent the book B1.

FIG. 3C depicts a hash table 380 associating each second entity of the second table 352 with the respective hash or summary hash values. For example, the summary hash value #A123 may be associated with second entity B1 and hash value #A3 may be associated with second entity B3.

At 201, a hash value is calculated for each first entity (e.g., for each author) of the first table 151. In one embodiment, the hash value may be calculated for each first entity of the first table 151 using all attributes 171*a-d* of the first record 161*a-c* representing the first entity. The calculated hash value may be stored in the first record in the first table 151. In one embodiment, a new column or attribute 371*e* may be added to the first table 151, resulting in the first table 351 as shown in FIG. 3A. For example, the hash value of the first record 361*b* is #A2 which is obtained by combining all values of the attributes 371*a*, 371*b*, 371*c*, and 371*d*.

Then, at 203, an inquiry is made to determine if a second record 162a-d of the second table 152 contains a reference to a first entity (e.g., whether a book contains a reference to or is written by one or more authors) of the first table 151.

If a second record 162a-d of the second table 152 is determined to contain a reference to a first entity of the first table 151, then at 205, an inquiry is made to determine if a second record 162a-d of the second table 152 contains only a single reference to a first entity of the first table 151. If the second record 162a-d of the second table 152 is determined to contain only a single reference to a first entity of the first table 151, data of the first record (e.g., data may be values of at least part of the attributes of the first record) of the first referenced entity is copied in step 207 to the second record. Data of the first record of the first referenced entity may be copied to the second record by creating a new column 372e or additional table that contains the copied data of records. The new column 372e may be a hidden column. A hidden column may be a column that is not displayed with other columns of the second table 152 when displaying the second table 152. This results in a new second table 352 as shown FIG. 3B.

For example, since the second records 362b-d of the second table 352 reference respectively to the first entities (authors) A1, A3, and A2, the values (376b-d) of the attributes 371a, 371b, 371c, and 371e of the first records 361a-c (of authors A1, A2 and A3) of the first table 351 that results from step 201 is copied as values of the additional column 372e for the respective second records 362b-d. The timestamp values 371d is also be copied to the second table.

If the second record is determined to contain several references to first entities of the first table 351 at 205, data of the referenced first records of the first entities is copied into the second record and a summary hash value is calculated at 209 based on all hash values of the referenced first entities.

For example, since the second record 362a references the first entities A1, A2 and A3, the values (376a) of the attributes 371a, 371b, 371c and 371e of the first records 361a-c (of authors A1, A2 and A3) of the first table 351 that results from step 201 is copied as values of the additional column 372e for the second record 362a.

Figure 4:
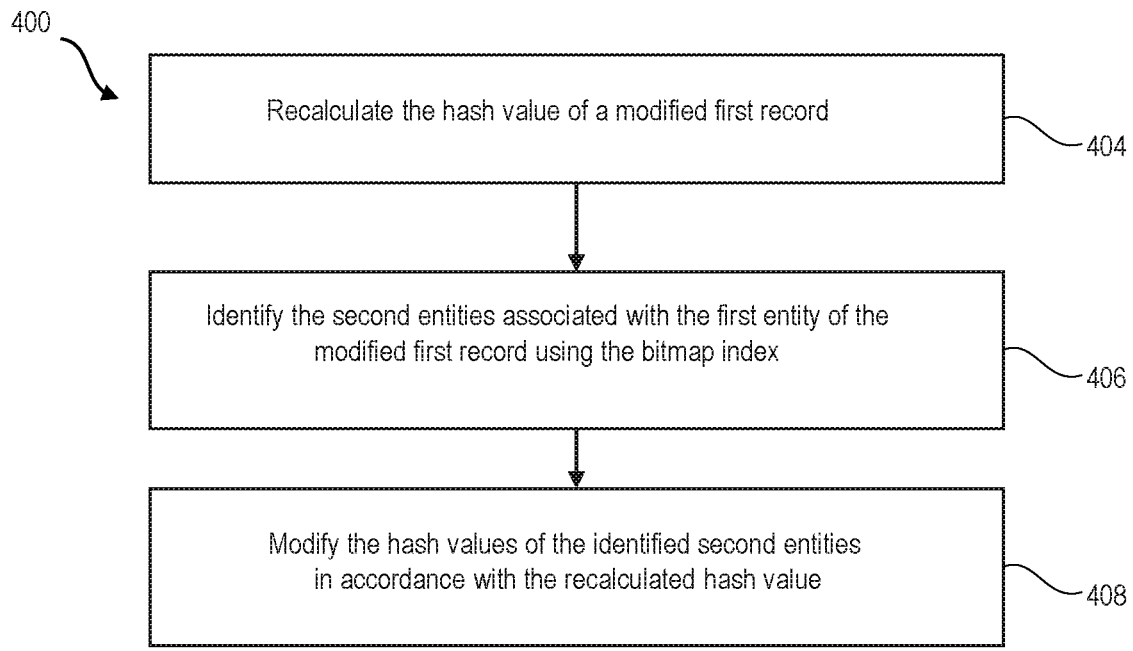
FIG. 4 is an operational flowchart illustrating a process for updating the second table in response to a modification to the first table according to at least one embodiment.

The summary hash value may be calculated as indicated in FIG. 4 by combining the individual hash values. The combination may be a sum of hash values or an XOR operation between the hash values. For example, for the second record 362a, the summary hash value may be calculated from the hash values of first records 361a-c as their respective first entities are referenced in the second record 362a. The summary hash value #A123 may be calculated as the sum of hash values A1, A2 and A3 or may be calculated as #A123=#A1 xor #A2 xor #A3. The summary hash value #A123 may be represented by the following equation [1]:

$$\#A123 = \Sigma_{n-3}^{1}(\#An) \quad [1]$$

Continuing with the previous example, data from the AUTHORS table is copied to the record of each book that is referencing a given author (for example record B1 contains copied records A1, A2 and A3). For a collection of authors linked with a given book the summary hash value may be calculated as a sum of each author's hash (or as XOR of hashes).

In one embodiment, 209 may be performed record by record. Following the example of the second record 362a, the copying of the data of the first records 361a-c and the calculation of the summary hash value may be performed one record by one record. For example, after copying the values of the first record 361a into the second record 362a, this results in updated values for the first record 361a in the second record 362a in addition to the existing values of the first records 361b and 361c. The summary hash value may be calculated using the current values 376a and if the summary hash value is different from the one stored in the hash table, the hash table may be updated accordingly by the new summary hash value. The following first record may be copied (e.g., the values of the first record 361b may be copied), resulting in the same content 376a because the values of the first records 361b did not change. The summary hash value would then be recalculated from the new content 376a and the result would be the same as a previously recalculated summary hash value which is in the hash table. Since there is no difference, the method would stop and the copy of the remaining record 361c may not be needed in particular as the changes to the first record 361c did not occur while performing 209.

Then, at 211, the hash value or the summary hash value is stored in the second record. The hash value of the referenced first entity (e.g., from 207) or the calculated summary hash value of the referenced more than one first entity (e.g., from 209) may be stored in the second record. For example, for the second record 362a a summary hash value 378a may be stored in column 372e, while for second records 362b-d the hash value (378b-d) of the respective referenced first entities is copied in the column 372e.

For example, if a given a second record has no reference to a first entity (e.g., does not meet the condition at 203), the value of the additional attribute or column 172e may be an empty value or other value that indicates that no reference is there.

The processes at 201-211 may result in table 351 and 352 of FIGS. 3A-3B. The usage of the resulting tables 351-352 may be advantageous as it may enable an efficient access to data by making use of the new structure of the two tables 351-352. For example, the tables 351-352 may be used as follows using the following optional processes 213-217.

At 213, a hash table is created. The hash table may be created associating each second entity of the second table 352 with the respective hash or summary hash values. An example of the hash table is shown in FIG. 3C. The hash table 380 of FIG. 3C maps attributes 382a-d which are the second entities (e.g., books B1-B4) with respective hash or summary hash values. For example, the second entity B1 which is of the second record 362a has a summary hash value #A123 (because as described above, second record 362a references multiple first entities and thus the hash value is a summary hash value that is a combination of hash values #A1, #A2 and #A3). The second entity B2 which is of the second record 362b has a hash value #A1 (not a summary hash value because as described above, second record 362b references a single first entity).

Then, at 215, the hash value of a given second record is compared with the value associated with the second entity of the given second record in the hash table. The hash table 380 may be used to read the second records of the second table 352. Reading of the second table may be triggered, for example, by a received request to read the content of at least part of the second table 352. For example, when reading a given second record (e.g., 362b of the second table 352), a comparison of the hash or summary hash value 378b of the given second record 362b may be performed with the value associated with the second entity B2 of the given second record 362b in the hash table 380.

For example, when reading the second record 362a, a comparison of the summary hash value 378a, which is

A123, may be performed with value of table 380 that is associated or mapped to the second entity B1 (which is represented by the second record 362a). In this case, #A123 would be compared with #A123.

Then, at 217, an inquiry is made to determine if there is a match. If it is determined at 217, that the comparison at 215 results in a match, the data of the one or more first records of the given second record is returned from the second table at 219. The data of the one or more first records may be values of at least part of the attributes 371a, 371b, 371c, and 371e that has been copied to the second table 352. Following the example of the second record 362a, if the comparison is successful in that the compared hash values are the same, at least part or all of the data 376a may be returned in response to the read request.

If it is determined at 217, that the comparison at 215 does not result in a match, the one or more first records of the given second record is read at 221 from the first table, and the first records in the second record is updated accordingly.

For example, when reading the second record 362b a comparison of the hash value 378b may be performed with value of table 380 that is associated or mapped to the second entity B2 (which is represented by the second record 362b). If the comparison fails because the compared hash values are not the same, the first record 361a of the first entity A1 to which the second record 362b references may be read from the first table 351 and may be copied in the second record 362b in order to replace the values 376b by the (last) read values of the first record 361a. This may enable updating of the values 376b. Then, at 219, at least part of the updated values 376b from 221 may be returned as a response to the read request.

In one embodiment, at least part of the process of FIG. 2 may automatically be performed (e.g., the processes at 215-221 may automatically be performed upon receiving a request to read data).

Referring now to FIG. 4, an operational flowchart illustrating the exemplary process 400 for updating the second table 352 in response to a modification to the first table 351 according to at least one embodiment is depicted. In addition, FIG. 4 depicts a bitmap index (e.g., a data table) 401 associating each second entity to first entities to which the second entity refers. Each cell of the table 401 involves a pair of first and second entities, wherein when the second entity references the first entity, the cell has a value of 1. However, when the second entity does not reference the first entity, the cell has an empty value or a value different from 1. For example, the book B1 which is a second entity represented by the second record 362a refers to the first entities which has authors A1, A2 and A3. Thus, the cells of the table 401 which correspond to the pairs (B1, A1), (B1, A2), and (B1, A3) has a value 1. FIG. 4 also depicts a modified first table 451 and a hash table 480 as will be detailed below.

At 404, the hash value of a modified first record is recalculated. In case of a modification of a first record (e.g., 361a of the first table 351), the hash value of the modified first record 461a is recalculated for the new or current values of the attributes 371a, 371b, 371c, and 371d. For example, if the name of the author A1 is changed from Name1 to Name11 (as shown in table 451), the hash value of attribute 371e is recalculated using the new value of the attribute 371c and the existing values (which are still the current values) of attributes 371a, 371b, and 371d of the first record 461a. The recalculated value is then stored as the attribute value of the hash attribute for the first record 461a. FIG. 4 illustrates an example where the name of the author A1 is changed from Name1 to Name11 and the resulting recalculated hash value is A11, replacing the old hash value A1.

Then, at 406, the second entities associated with the first entity of the modified first record is identified using the bitmap index 401. For example, if the first record 461a is modified as exemplified in FIG. 4, the second entities B1 and B2 (FIG. 3B) may be identified as they both reference to the author A1 of the first record 361a (FIG. 3A).

Then, at 408, the hash values of the identified second entities is modified in accordance with the recalculated hash value. Following the example of FIG. 4, the hash values 378a and 378b that are stored in the column 372e of the second records 362a-b that represent respectively the second entities B1 and B2 may be modified. For example, the hash value 378b may be modified to replace has value #A1 by new hash value #A11. The summary hash value 378a may be modified by for example recalculating the summary hash value as described before but using A11 instead of A1. As described above, the summary hash value 378a may the sum of hash values #A1, #A2 and #A3. The recalculation of the summary hash value may include (as indicated in the hash table 480 of FIG. 4) subtracting the hash value #A1 from #A123 and adding the hash value #A11 to the resulting subtraction resulting in the new summary hash value #A1123. The hash table 480 as shown in FIG. 4 may be updated with the new recalculated hash values in order to maintain the hash table 480 in an up-to-date format.

The process 400 of FIG. 4 may automatically be performed in response to a change in the first table 351.

Figure 5:
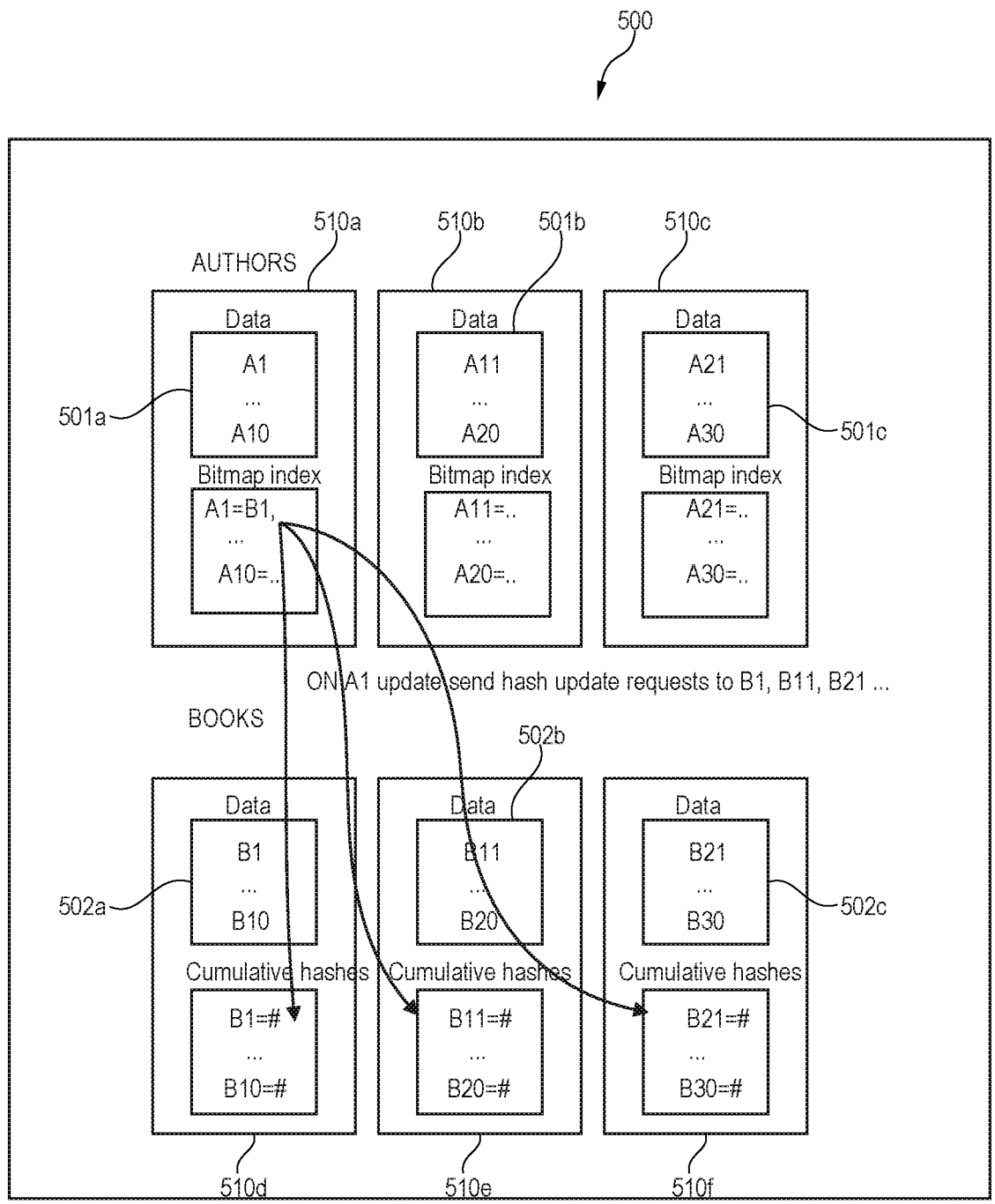
FIG. 5 is a block diagram illustrating a database shard in accordance with an embodiment of the present disclosure.

Referring now to FIG. 5, a block diagram illustrating a database shard 500 according to at least one embodiment is depicted. The database shard 500 may include multiple shards 510a-f. In one embodiment, 30 first records of the first entities A1-A30 of the first table 351 may be provided and 30 second records of the second entities B1-B30 of the second table 352 may be provided.

The first records may be split into multiple sets of first records. For example, the 30 first records may be split into three sets 501a, 501b, and 501c of first records representing the sets of first entities A1-A10, A11-A20, and A21-A30, respectively.

The second records may be split into multiple sets of second records. For example, the 30 second records may be split into three sets 502a, 502b, and 502c of second records representing the sets of second entities B1-B10, B11-B20, and B21-B30, respectively.

Shards 510a-c may be assigned to the first records (e.g., AUTHORS table) and shards 510d-f may be assigned to the second records (e.g., BOOKS table).

Each of the sets of the first records 501a-c may be stored in the respective shard 510a-c. Each of the sets of the second records 502a-c may be stored in the respective shard 510d-f.

Each of the shards 510a-c may further store a set of elements of the bitmap index 401 that corresponds to the set of first records of that shard. For example, the shard 510a may further store the elements of the bitmap index 401 that maps the first entities A1-A10 (of the first records that are stored in the shard 510a) to their associated second entities.

Each of the shards 510d-f may further store a set of elements of the hash table 380 that corresponds to the set of second records of that shard. For example, the shard 510e may further store the elements of the hash table 380 that maps the second entities B11-B20 (of the second records that are stored in the shard 510e) to their associated hash values.

The storage of the data in the shard database 500 may enable an efficient manipulation and processing of the data (e.g., of the second table 352). For example, in response to a change of data in a given shard (e.g., a change or update to attribute values of entity A1 of the bitmap index as illustrated in FIG. 5), an update request is automatically sent by the shard 510a to the shards 510d-f. The update request may include the new and old hash value of the first record that represents A1 (this is because the hash values of shards 510d-f may be built from the first record that represents A1). As such, each author modification may entail sending the old author hash and the new author hash to many shards containing books data.

In one embodiment, when removing an author from the first table, the same bitmap index may be used to implement cascade (e.g., between shards as described above) constraints and remove the given author from all linked tables or books.

The present embodiment may for example be implemented using a HBase coprocessor.

According to one embodiment, ensuring integrity of records in a NoSQL database including a first table and a second table may be provided. The method may include, in a first table including one or more first records, for each first record, calculating a record hash value based on all attributes of the first record. The method may include, in a second table including one or more second records, for each second record, when second record includes one or more references to the first record, copying data of the first record to the second record and when the second record includes more than one reference to the first record, calculating a summary hash value based on all record hash values of the referenced first records. The method may then include, in the first table, for each first record, calculating a bitmap index of second records referencing the first record upon modification of the first record, recalculating the record hash value, and using the bitmap index, determining which of the summary hash values of the second records require a corresponding update. The method may further include, when reading a second record, comparing the summary hash value with the record hash values of the referenced first records. Then, if the comparison results in a match, returning the references to the first record from the second table. However, if the comparison does not result in a match, reading the referenced first records from the first table, and updating the references to the first records in the second record.

It may be appreciated that FIGS. 1-5 provide only an illustration of one embodiment and do not imply any limitations with regard to how different embodiments may be implemented. Many modifications to the depicted embodiment(s) may be made based on design and implementation requirements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for ensuring integrity of a record in a NoSQL database including a first table having a plurality of first records associated with a respective plurality of first entities and a second table having plurality of second records associated with a respective plurality of second entities, the method comprising:

for each first entity of a first table, calculating a hash value using all attributes of a first record associated with the first entity;

adding a hash value column to the first table;

storing the calculated hash value for each first entity in the added hash value column associated the first record in the first table;

adding a hidden data mapping column to a second table having plurality of second records associated with a respective plurality of second entities;

in response to a second record of the plurality of second records in the second table referencing a single first entity of the first table, copying a data of the first record of the referenced single first entity to a row of the added hidden data mapping column associated with the second record and storing, in the row of the added hidden data mapping column associated with the second record, a hash value of the referenced single first entity;

in response to the second record of the plurality of second records in the second table referencing a plurality of first entities of the first table, copying a plurality of data of the plurality of first records of the referenced plurality of first entities to the row of the added hidden data mapping column associated with the second record, calculating a summary hash value based on all hash values of the referenced plurality of first entities, and storing, in the row of the added hidden data mapping column associated with the second record, the calculated summary hash value of the referenced plurality of first entities;

in response to storing, in the second record, the hash value of the referenced single first entity, creating a hash table associating each second entity with a respective hash value; and in response to storing, in the second record, the calculated summary hash value of the referenced plurality of first entities, creating the hash table associating each second entity with a respective calculated summary hash value; and in response to displaying the second table, hiding the added hidden data mapping column such that the added hidden data mapping column is not displayed with other columns of the displayed second table.

2. The method of claim 1, further comprising:
reading the second record of the second table;
comparing the stored hash value of the second record with a value associated with the second entity of the second record in the created hash table;
in response determining a match between the compared hash value of the second record and the value associated with the second entity of the second record in the created hash table, returning the data of the first record associated with the second record from the second table; and
in response determining no match between the compared hash value of the second record and the value associated with the second entity of the second record in the created hash table, reading the first record associated with the second record from the first table, and updating the first record in the second record.

3. The method of claim 1, further comprising:
reading the second record of the second table;
comparing the stored summary hash value of the second record with a value associated with the second entity of the second record in the created hash table;
in response determining a match between the compared summary hash value of the second record and the value associated with the second entity of the second record in the created hash table, returning the plurality of data of the plurality of first records associated with the second record from the second table; and in response determining no match between the compared summary hash value of the second record and the value associated with the second entity of the second record in the created hash table, reading the plurality of first records associated with the second record from the first table, and updating the plurality of first records in the second record.

4. The method of claim 1, further comprising:

creating a bitmap index associating each of the second entities to at least one first entity referencing the second entity; and in response to modifying the first record of the first table:
recalculating the stored hash value of the modified first record;
identifying, using the bitmap index, each of the second entities associated with the first entity of the modified first record; and
modifying the hash value or the summary hash value of each the identified second entities in accordance with the recalculated hash value of the modified first record.

5. The method of claim 1, further comprising:

reading the plurality of first records from the first table, updating, record by record, the plurality of first records in the second record;

for each first record being copied to the second record, recalculating the summary hash value using all hash values of the plurality of first records of the second record;

comparing the recalculated summary value with the hash value in the created hash table; and in response to determining a match between the compared summary hash value and the hash value in the created hash table, stopping the copying of the plurality of first records to the second record.

6. The method of claim 1, further comprising:

providing a database shard;

splitting the plurality of first records into multiple sets of first records;

storing each of the multiple sets of first records in a first shard of the database shard, wherein the first shard includes an indication of each first entity of the stored multiple sets of first records and at least one second entity associated with each first entity;

splitting the plurality of second records into multiple sets of second records; and storing each of the multiple sets of second records in a second shard of the database shard including a plurality of hash values, wherein the second shard includes for each second record of the stored multiple sets of second records, the hash value or the summary hash value.

7. The method of claim 1, further comprising using a HBase coprocessor.

8. The method of claim 6, further comprising:

in response to modifying the first record of the first shard, sending an automatic update request by the first shard to the second shard including the second records referencing the modified first record, wherein the sent automatic update request includes a first hash value of the first record before being modified and a second hash value determined for the modified first record.

9. The method of claim 4, further comprising:

recalculating the summary hash value of the modified first record by subtracting the hash value of the modified first record and adding the modified hash value to the summary hash value.

10. A computer system for ensuring integrity of a record in a NoSQL database including a first table having a plurality of first records associated with a respective plurality of first entities and a second table having plurality of second records associated with a respective plurality of second entities, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

for each first entity of a first table, calculating a hash value using all attributes of a first record associated with the first entity;

adding a hash value column to the first table;

storing the calculated hash value for each first entity in the added hash value column associated the first record in the first table;

adding a hidden data mapping column to a second table having plurality of second records associated with a respective plurality of second entities;

in response to a second record of the plurality of second records in the second table referencing a single first entity of the first table, copying a data of the first record of the referenced single first entity to a row of the added hidden data mapping column associated with the second record and storing, in the row of the added hidden data mapping column associated with the second record, a hash value of the referenced single first entity;

in response to the second record of the plurality of second records in the second table referencing a plurality of first entities of the first table, copying a plurality of data of the plurality of first records of the referenced plurality of first entities to the row of the added hidden data mapping column associated with the second record, calculating a summary hash value based on all hash values of the referenced plurality of first entities, and storing, in the row of the added hidden data mapping column associated with the second record, the calculated summary hash value of the referenced plurality of first entities;

in response to storing, in the second record, the hash value of the referenced single first entity, creating a hash table associating each second entity with a respective hash value; and in response to storing, in the second record, the calculated summary hash value of the referenced plurality of first entities, creating the hash table associating each second entity with a respective calculated summary hash value; and in response to displaying the second table, hiding the added hidden data mapping column such that the added hidden data mapping column is not displayed with other columns of the displayed second table.

11. The computer system of claim 10, further comprising:

reading the second record of the second table;

comparing the stored hash value of the second record with a value associated with the second entity of the second record in the created hash table;

in response determining a match between the compared hash value of the second record and the value associated with the second entity of the second record in the created hash table, returning the data of the first record associated with the second record from the second table; and in response determining no match between the compared hash value of the second record and the value associated with the second entity of the second record in the created hash table, reading the first record associated with the second record from the first table, and updating the first record in the second record.

12. The computer system of claim 10, further comprising:
reading the second record of the second table;
comparing the stored summary hash value of the second record with a value associated with the second entity of the second record in the created hash table;
in response determining a match between the compared summary hash value of the second record and the value associated with the second entity of the second record in the created hash table, returning the plurality of data of the plurality of first records associated with the second record from the second table; and
in response determining no match between the compared summary hash value of the second record and the value associated with the second entity of the second record in the created hash table, reading the plurality of first records associated with the second record from the first table, and updating the plurality of first records in the second record.

13. The computer system of claim 10, further comprising:
creating a bitmap index associating each of the second entities to at least one first entity referencing the second entity; and
in response to modifying the first record of the first table:
recalculating the stored hash value of the modified first record;
identifying, using the bitmap index, each of the second entities associated with the first entity of the modified first record; and
modifying the hash value or the summary hash value of each the identified second entities in accordance with the recalculated hash value of the modified first record.

14. The computer system of claim 10, further comprising:
reading the plurality of first records from the first table,
updating, record by record, the plurality of first records in the second record;
for each first record being copied to the second record, recalculating the summary hash value using all hash values of the plurality of first records of the second record;
comparing the recalculated summary value with the hash value in the created hash table; and
in response to determining a match between the compared summary hash value and the hash value in the created hash table, stopping the copying of the plurality of first records to the second record.

15. The computer system of claim 10, further comprising:
providing a database shard;
splitting the plurality of first records into multiple sets of first records;
storing each of the multiple sets of first records in a first shard of the database shard, wherein the first shard includes an indication of each first entity of the stored multiple sets of first records and at least one second entity associated with each first entity;
splitting the plurality of second records into multiple sets of second records; and
storing each of the multiple sets of second records in a second shard of the database shard including a plurality of hash values, wherein the second shard includes for each second record of the stored multiple sets of second records, the hash value or the summary hash value.

16. A computer program product for ensuring integrity of a record in a NoSQL database including a first table having a plurality of first records associated with a respective plurality of first entities and a second table having plurality of second records associated with a respective plurality of second entities, comprising:
one or more computer-readable tangible storage media and program instructions stored on at least one of the one or more computer-readable tangible storage media, the program instructions executable by a processor to cause the processor to perform a method comprising:
for each first entity of a first table, calculating a hash value using all attributes of a first record associated with the first entity;
adding a hash value column to the first table;
storing the calculated hash value for each first entity in the added hash value column associated the first record in the first table;
adding a hidden data mapping column to a second table having plurality of second records associated with a respective plurality of second entities;
in response to a second record of the plurality of second records in the second table referencing a single first entity of the first table, copying a data of the first record of the referenced single first entity to a row of the added hidden data mapping column associated with the second record and storing, in the row of the added hidden data mapping column associated with the second record, a hash value of the referenced single first entity;
in response to the second record of the plurality of second records in the second table referencing a plurality of first entities of the first table, copying a plurality of data of the plurality of first records of the referenced plurality of first entities to the row of the added hidden data mapping column associated with the second record, calculating a summary hash value based on all hash values of the referenced plurality of first entities, and storing, in the row of the added hidden data mapping column associated with the second record, the calculated summary hash value of the referenced plurality of first entities;
in response to storing, in the second record, the hash value of the referenced single first entity, creating a hash table associating each second entity with a respective hash value; and
in response to storing, in the second record, the calculated summary hash value of the referenced plurality of first entities, creating the hash table associating each second entity with a respective calculated summary hash value; and
in response to displaying the second table, hiding the added hidden data mapping column such that the added hidden data mapping column is not displayed with other columns of the displayed second table.

17. The computer program product of claim 16, further comprising:
reading the second record of the second table;
comparing the stored hash value of the second record with a value associated with the second entity of the second record in the created hash table;

in response determining a match between the compared hash value of the second record and the value associated with the second entity of the second record in the created hash table, returning the data of the first record associated with the second record from the second table; and in response determining no match between the compared hash value of the second record and the value associated with the second entity of the second record in the created hash table, reading the first record associated with the second record from the first table, and updating the first record in the second record.

18. The computer program product of claim 16, further comprising:

reading the second record of the second table;

comparing the stored summary hash value of the second record with a value associated with the second entity of the second record in the created hash table;

in response determining a match between the compared summary hash value of the second record and the value associated with the second entity of the second record in the created hash table, returning the plurality of data of the plurality of first records associated with the second record from the second table; and in response determining no match between the compared summary hash value of the second record and the value associated with the second entity of the second record in the created hash table, reading the plurality of first records associated with the second record from the first table, and updating the plurality of first records in the second record.

19. The computer program product of claim 16, further comprising:

creating a bitmap index associating each of the second entities to at least one first entity referencing the second entity; and in response to modifying the first record of the first table:
recalculating the stored hash value of the modified first record;
identifying, using the bitmap index, each of the second entities associated with the first entity of the modified first record; and
modifying the hash value or the summary hash value of each the identified second entities in accordance with the recalculated hash value of the modified first record.

20. The computer program product of claim 16, further comprising:

reading the plurality of first records from the first table, updating, record by record, the plurality of first records in the second record;

for each first record being copied to the second record, recalculating the summary hash value using all hash values of the plurality of first records of the second record;

comparing the recalculated summary value with the hash value in the created hash table; and in response to determining a match between the compared summary hash value and the hash value in the created hash table, stopping the copying of the plurality of first records to the second record.

* * * * *